Patented Aug. 30, 1932

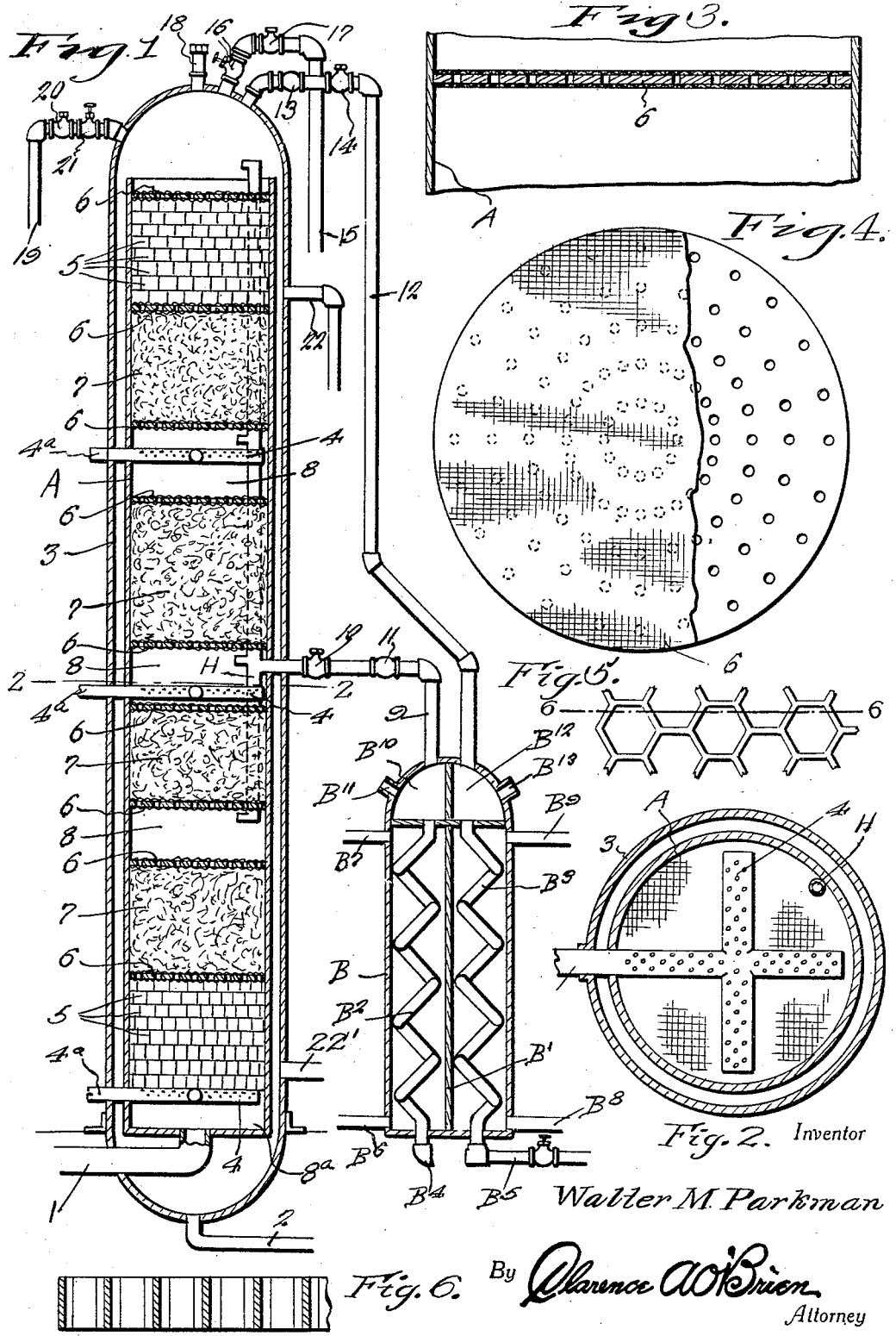

1,875,199

UNITED STATES PATENT OFFICE

WALTER M. PARKMAN, OF JACKSON, MISSISSIPPI, ASSIGNOR OF TWENTY-THREE ONE-HUNDREDTHS TO J. S. WATSON, OF LEXINGTON, MISSISSIPPI

APPARATUS FOR SEPARATING A PLURALITY OF CONDENSATES OF THE HYDROCARBON CONSTITUENTS OF NATURAL GAS

Application filed November 10, 1931. Serial No. 574,170.

My invention relates to the separation of natural gas as it comes from the well into all its constituent hydrocarbon elements methane, ethane, propane, butane, pentane, hexane, heptane and octane and their liquefication in a purified form. My device deals primarily with natural gas but may be used also in the fractionation of other gases. Particular problems are met with in the art of natural gas separation, such as the separation and isolation of the constituent hydrocarbons of gasoline, and the separation and condensation selectively by means of temperature control of certain constituents of the gas. I have had regard in constructing my apparatus to these particular problems and also its use in relation to the larger problem of a complete analytical separation of natural gas into its hydrocarbon constituents and the liquefaction of certain of such constituents.

An object of my invention is to subject the natural gas as it comes from the well to a cleaning and drying process for removing water and sulphur impurities therefrom.

Another object is to provide an efficient absorption process for the purpose of separating out certain highly volatile hydrocarbon constituents of the gas and reduction of the separated elements to liquid form in a state substantially pure.

Another object of my invention is to provide means for the complete analytical separation of natural gas into its constituent hydrocarbon elements and forming certain condensates in a purified liquid form.

The foregoing objects are attained by the use of my apparatus which has been constructed as a result of years of experiments in the field of natural gas separation and I believe other desirable results are possible through the use of this device which may develop by further experimentation.

Referring to accompanying drawing which illustrates the preferred form or embodiment of my device;

Fig. 1 is a cross sectional view of the first extracting and separating unit employed in my invention.

Fig. 2 is a cross section on line 6—6 of Fig. 1.

Fig. 3 is a detail view in cross section through one of the perforated baffles, screen equipped.

Fig. 4 is a plan view of one of the perforated baffles with a portion of the screen broken away.

Fig. 5 is a fragmentary view in plan showing a portion of one of the perforated honeycomb baffles.

Fig. 6 is a sectional view taken substantially on the line 6—6 of Fig. 5.

Referring to the drawing in detail for a complete description of the preferred form of my apparatus, an inlet pipe I is provided to introduce natural gas from the well into the inner chamber of A, which is a cylindrical structure of tower form and is provided with an outer shell 3. By 4 is designated a steam inlet pipe and 4a is a steam jet.

Natural gas as it comes from the well in its raw state contains more or less water, and sulphur. For removing these impurities I provide a baffle element of novel construction. It is shown in detail in Fig. 5. The baffle unit 5 is made of copper sheets, laid in a series one above the other and perforated by openings of the honeycomb type, throughout the whole area of the baffle units. The baffle units are adapted to facilitate deposit of the impurities out of the gas upon the faces of the baffle perforations contacted by the gas in its passage therethrough. Another baffle element 6 is provided with openings and screened on its upper and lower surfaces by a layer of copper wire. Baffles units 5 are removably superimposed one upon the other at the upper and lower ends of A, and baffles 6 are located immediately on top of the series of baffles 5 and also just underneath the upper series of plates 5. Baffles 6 are also placed at the upper and lower ends of openings 8 spaced through A, and whose use in connection with absorber elements 7 will be explained.

The absorbing element 7 preferably consists of red cedar charcoal, though other carbonaceous materials may be used effectively. Red cedar charcoal is dried, introduced into the open chambers or compartments provided within the inner section or chamber of A in readiness for the inflow of gas. The great porosity of the charcoal, in connection with the cooling system provided between the inner and outer shells of A maintain the absorption of natural gas at a maximum efficiency.

A feature of my device which effects completer absorption of the constituent hydrocarbon elements of natural gas is the provision of openings 8 by which the absorptive process is broken up and the gas caused to pass through a plurality of separate bodies of absorbing matter resulting in the maximum contact with the exposed faces of absorbing charcoal and a resulting absorption of natural gas constituents therein.

The outer shell 3 with the inner tower structure of A forms an enveloping space between them which is the means for affecting the temperature within A as desired. This is for the purpose of control of the absorption process by circulating a cooling medium therein under conditions requiring it. The circulating medium, so circulated could be used to lower the temperature of A. After use the cooling fluid may be discharged by pipe 2. Line 22 opening into the outer shell 3 below the top and near the bottom of the absorber tower provides means for circulating water or other medium.

By 9 is designated a conduit pipe connected with a header H extending through all sections 7 of absorbing material and provided in each opening 8 with an intake opening whereby gaseous vapors will pass from the absorber A through 9 into condenser B. At 10, I show a conventional temperature control valve. As steam entering at 4a heats the absorber the valve 10 begins to open and is set to fully open at a predetermined temperature point which is approximately the boiling point of the constituent desired to be distilled or the boiling point of that constituent of a group of constituents to be distilled together which is relatively the highest, for removing said vaporized constituents by line 9 to condenser B. At the end point of the constituent gas desired valve 10 closes and valve 14 on line 12 opens and remaining gaseous vapors distilled out of absorber 7 by the steam are drawn off through line 12 into condenser B. The flow of gaseous vapors through 12 continues until the temperature of A reaches approximately 280° F. when valve 14 automatically closes and simultaneously automatic temperature control valves on steam connection 4a close and valve 20 on line 19 opens. The intake 22 which is shown in the lower right end of A is provided with automatic valve for temperature control. A line 19 is provided to draw off from A the remaining gaseous vapors, also to dry out and cool absorbing charcoal 7, which may then be used again as the absorbing element.

The pipe 19 is provided with an automatic temperature control valve 20 also a gate valve 21. At approximately 750° F. valve 20 automatically opens and a vacuum pump draws off from A through 9 the steam and remaining fractions of gaseous vapor. These are passed off through line 19. When A has been reduced in temperature to approximately 200° F. the automatic valve on the cooling unit intake 22 opens and the cooling system 22 is set in operation to reduce the temperature of A as desired, according to the boiling point of the constituent hydrocarbon element which it is desired to separate and liquefy when the absorber is again used. The charcoal absorber having been dried out and cooled by the vacuum pump and cooling element, another cycle of operation of the absorber may be begun at the proper temperature according to whatever element or elements are desired to be separated and liquefied.

The condenser B is constructed in two sections, left and right, divided by wall B1 through the center from top to bottom. Above the two condensing sections and separated from them by solid horizontal member, are two open chambers B10 and B12, on the left and right hands respectively. In the left hand section of B is one or more coil elements B2, and in the right, coil B3. Each coil engages through the horizontal member which separates chambers B10 and B12 from the two sections of condenser B, and is open at its upper end for free connection into its respective chamber. Coil elements B2 and B3 are passed through the lower end wall of the condenser and carry lines B4 and B5 to accumulator tanks.

A method of operation of my apparatus is used for accomplishing the separation and liquefaction of the hydrocarbon elements of natural gas by treating the gas to draw off the constituents singly or in small groups of those constituents whose boiling points do not widely vary.

Natural gas enters at 1 in tower A at approximately 60° F. and at low pressure, passing through baffle plates 5 for cleaning it of foreign matter, and into absorber element 7. The charcoal absorber which I use by preference is shown by experience to be an efficient absorbing agent. On account of its great porosity a good "run" of gas is taken up before saturation point is reached. The walls of the cavities of the charcoal absorber appear to be of more than ordinary strength, as the element may be dried out after the distillation process which follows absorption is completed, and it may be used again. Furthermore, heating of the absorbing element during the absorption process is not so great as in the use of other kinds of absorbers, whereby the use of the cooling system provided is made unnecessary or nearly so.

The paraffin hydrocarbon constituents of natural gas are not equally absorbable by the charcoal absorber. Octane, whose boiling point is 258° F. and heptane, liquefying at or below 209° F., are readily absorbed, as are also those constituents which are the main constituents of gasoline, pentane and hexane. The boiling point of the latter is 156° F. and that of pentane, 98° F. Butane is still more volatile with a boiling point of 32° F. (or, 0° C.), propane at −47° F., ethane at −129° F. and methane, spoken of as "wild" gas, almost a permanent gas, with boiling point of −256° F. It is known that no hydrocarbon constituent of natural gas will be absorbed and retained efficiently by an absorber which stands at a temperature higher than the boiling point of that constituent element. For if the temperature of the gas absorbing member is not lower than the boiling point of any given constituent element, that element will volatilize and pass off. In my advice, this principle is taken advantage of to effect a continuous, selective and approximately total separation of single or, (from the standpoint of boiling points,) closely grouped hydrocarbon constituents of the gas, and their liquefaction or condensation for any desired use.

If it is desired to condition tower A for absorbing all of the constituents, for example, except methane, (−256° F.), then it will be necessary to reduce the temperature of the member A to or below −129° F., whereby ethane and all the other constituents will be absorbed. The circulatory cooling system provided between the outer and inner shells of A makes this possible, if desired. In practical operation, however, a temperature is maintained at about 32° F., the boiling point of normal butane, leaving the high volatile constituents unabsorbed, to be drawn off by line 15. At 10, 11 on line 9 and at 13, 14 on line 12, leading from absorber member A to condenser B, and at 16, 17 on line 15 leading from A, are provided conventional temperature indicating and control valves, pressure recording and controlling instruments, whereby desired conditions may be maintained and selective operations controlled, as stated.

At a temperature, then, of 32° F., in absorber A, element 7 will take up all constituent elements whose boiling points are not lower than 32° F. In actual plant practice, it is found that some of the propane will travel along with the butane and also be taken up by the absorber. Butane, pentane, heptane, hexane and octane are absorbable at 32° F. The unabsorbed elements methane, ethane and propane in part will pass off through line 15 to a compressor for further treatment.

When the absorbent element 7 in member A has been saturated with gas, the steam line is opened at 4a and steam enters. Treatment of all sections of the absorbent element 7 may be effected by entering steam below the bottom section or compartment 7 and distilling absorbed constituents through the uppermost inlet to the header, and treatment of either the bottom, middle or top sections separately may be effected by admitting the steam by a conduit 4 just below the section or sections to be treated and distilling by means of the header inlet just above the section or sections being treated. The temperature control on line 9, a conduit leading out of A, begins to open as the temperature of 7 rises under the influence of steam. As the temperature rises to higher points constituent gas elements of higher and higher boiling points are caused to be thrown off. The temperature control is adjusted to close the valve 10 at a point a few degrees below the boiling point of the gas constituent desired to be taken off by line 9. When this point is reached valve 10 closes and valve 14 on line 12 opens. Gaseous vapors passing out of A by pipe 9 enter the left hand section B10 of condenser B. Returning to A, we will see that by the opening of line 12, another conduit out of A, at valve 14, a way is provided for all remaining absorbed gas constituents not taken off by line 9 to pass out by such line 12 into the right hand section B12 of B. Control element 14 on line 12 closes when the desired temperature is reached for taking off the remaining constituents, and as 14 closes, the steam jet 4a on steam line 4 also closes.

At the same time valve 21 on line 19 opens. During the absorption period line 15 stands open and serves to carry off the residue of gases not absorbed. When steam is introduced the valve on 15 is closed. Line 19 has a vacuum connection for drawing off whatever fractions of gas remain at this stage in the hollow chamber at the top of A and also for drying out and cooling the absorber member 7 for use again. When vacuum line 19 has operated to dry out and cool the absorber 7 to approximately 200° F., the valve on cooling system 22 opens and the circulation of a cooling fluid therein reduces the temperature of member A to the point desired for another operation. Leaving the discussion of the treatment of the unabsorbed gases conducted off by line 15 and line 19 until later, it will be seen that in condenser B, cooling connections B6 and B7 on the left hand section B10 and B8 and B9 on the right hand section B12, are provided. These are used to lower the temperature of the condenser to the desired point, depending on the boiling point of the constituents introduced by lines 9 and 12, respectively, and to be liquefied and drawn off at B4 and B5. The gases entering B10 are reduced by coil B2 to liquid form and pass out to B4. For example, the temperature control at 10 on line 9 may be set at a point just below the boiling point of pentane, and as a result, all vapors of gas constituents from absorber 7 of a lower boiling point than pentane will be drawn off by 9. Experience in the operation of this plant shows that a little pentane, the butane and most of the propane are thus drawn off. By action of coil B2 these are liquefied and pass into accumulator tank connected with B4.

The gases entering B by line 12 consist of the gas constituents of a high boiling point and are cooled in a like manner by coil B3, in the section on the right hand side of B, to be condensed and drawn off at B5.

What I claim is:

1. An apparatus for separating a plurality of condensates of the hydrocarbon constituents of natural gas of relatively high boiling point, including an absorber member of tower like construction, means for introducing a flow of gas into said member near the bottom, an absorbing element disposed in said member adapted to absorb hydrocarbon constituents of natural gas of relatively high boiling point, pipes for introducing steam into said member below the absorbing element, a discharge pipe near the top of the tower member for removal of unabsorbed gas constituents of low boiling point, an automatic temperature controlled valve on said discharge pipe operable on admission of steam by said steam pipes to cut off said discharge of unabsorbed constituents at the close of the absorption period, a plurality of discharge pipes from said member for removing selectively the absorbed constituents during the distillation period, condensers connected with said discharge pipes for effecting condensates of said constituents, automatic temperature controlled valves on each of said discharge pipes operable to regulate the discharge of absorbed constituents from the member into said condensers at temperatures predetermined according to the boiling points of said constituent gases.

2. An apparatus for separating a plurality of condensates of the hydrocarbon constituents of natural gas of relatively high boiling point, including a tower like absorber, a conduit connected near the bottom of said member for introducing natural gas from the well, perforated baffle plates grouped together near the bottom and top of said member for removing impurities from the gas, an absorbing element consisting of red cedar charcoal disposed in the main body of said member, a discharge pipe near the top of the member for removing unabsorbed constituents of low boiling point, pipes for introducing steam in said member below the absorbing element, an automatic temperature controlled valve on said discharge pipe operable on admission of steam by said steam pipes to cut off said discharge of unabsorbed constituents at the close of the absorption period, a plurality of discharge pipes from said member for removing absorbed constituents during the distillation period, automatic temperature controlled valves on each of said discharge pipes operable to regulate said discharge of absorbed constituents from said member at temperatures predetermined according to the varying boiling points of said constituents successively reached during the distillation period, for effecting a selective separation of said constituents.

3. An apparatus for separating a plurality of condensates of the hydrocarbon constituents of natural gas having a relatively high boiling point, including an absorber and distillation member of shell construction and tower form, a pipe entering said member near the bottom for introducing gas, perforated baffle plates grouped together near the bottom of said member intermediate the gas inflow and the main body of said member and also near the top of said member so as to provide an open space near the top of the member, baffle plates arranged in pairs throughout the main body of the member so as to form compartments for an absorbing element with spaced openings between each of said compartments, a charcoal absorbing element housed in each of said compartments pipes for introducing steam into said member below the absorbing element, a discharge pipe connecting in said member near the top for removing unabsorbed constituents of low boiling point, an automatic temperature controlled valve on said discharge pipe operable on admission of steam by said steam pipes to cut off said discharge at the close of the absorption period, a plurality of discharge pipes from said member for removing absorbed constituents during the distillation period, a header connected with one of said discharge pipes and connecting in each of the spaced openings in said member, automatic temperature controlled valves on said discharge pipes operable to regulate the discharge of absorbed constituents from said member at temperatures predetermined according to the varying successive boiling points of said constituents, condensers connected with said discharge pipes adapted for effecting the condensation of said constituents.

4. An apparatus for separating a plurality of condensates of hydrocarbon constituents of natural gas having relatively high boiling points, including a unitary absorber and distilling member of tower shell construction, a pipe entering said member near the bottom for introducing natural gas, perforated honey comb copper baffle plates grouped together in said member intermediate the gas inflow and the main body of the member for removing impurities from the gas, a charcoal absorbing element disposed in said member, a discharge pipe near the top of said member for removing unabsorbed constituents of low boiling points, pipes for introducing steam into said member below the absorbing element, an automatic temperature controlled valve on said pipe to cut off the discharge of said unabsorbed constituents on admission of steam by said steam pipes at the close of the absorption period, a plurality of discharge pipes from said member for removing selectively the absorbed constituents during the distillation process, automatic temperature controlled valves on each of said pipes operable to regulate the discharge of absorbed constituents from said member at temperatures predetermined according to the varying boiling points of said constituents either singly or in groups of such constituents as do not widely vary.

5. An apparatus for separating a plurality of condensates of the hydrocarbon constituents of natural gas having relatively high boiling points, including a unitary absorber and distilling member of upright tower form, a pipe entering said member near the bottom for introducing natural gas, baffle plates for removing impurities from the gas grouped together near the bottom above the gas pipe and near the top so as to provide an open pocket at the top, baffles arranged in pairs throughout the main body of the member so as to form compartments for an absorbing element with spaced openings between said compartments, a solid absorbing element disposed in each of said compartments, pipes for introducing steam into said member below the absorbing element, a discharge conduit connected in the pocket at the top of said member for removing unabsorbed constituents of low boiling point, an automatic temperature controlled valve on said discharge conduit operable on admission of steam by said steam pipes to cut off the discharge at the close of the absorption period, a plurality of discharge pipes from said member for removing absorbed constituents during the distillation period, a header connected with one of said discharge pipes and cooperating in each of the spaced openings in said member, automatic temperature controlled valves on each of said discharge pipes operable to regulate the discharge of absorbed constituents from said member at temperatures predetermined according to the varying boiling points of said constituents, condensers connected with said discharge pipes adapted to effect condensation of said constituents.

6. An apparatus for separating a plurality of condensates of hydrocarbon constituents of natural gas of higher boiling points, including an absorber member tower like and of shell construction, a gas line entering said member at the bottom, baffle plates in said member disposed multiple near the upper and lower ends and singly throughout said member to provide housings, a charcoal absorbing element arranged in each of said housings, pipes for introducing steam in said member below the absorbing element, a discharge conduit near the top of said member for removing unabsorbed constituents during the absorption period, an automatic temperature controlled valve on said conduit operable on admission of steam by said steam pipes to cut off said discharge of highly volatile constituents at the close of the absorption period, a plurality of discharge pipes from said member for removing absorbed constituents of higher boiling points during a distillation period, automatic valves on each of said discharge pipes controlled by the temperature in said member operable to regulate the discharge of absorbed constituents from said member at predetermined temperatures according to the varying successive boiling points reached during the distillation process, said temperature control of said discharge operating to effect a multistage, selective separation of said constituents.

In testimony whereof I affix my signature.

WALTER M. PARKMAN.